(12) United States Patent
Fukuda et al.

(10) Patent No.: US 12,051,266 B2
(45) Date of Patent: Jul. 30, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventors: Junichi Fukuda, Tokyo (JP); Ryosuke Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 17/417,919

(22) PCT Filed: Dec. 24, 2019

(86) PCT No.: PCT/JP2019/050709
§ 371 (c)(1),
(2) Date: Jun. 24, 2021

(87) PCT Pub. No.: WO2020/138120
PCT Pub. Date: Jul. 2, 2020

(65) Prior Publication Data
US 2022/0075982 A1    Mar. 10, 2022

(30) Foreign Application Priority Data

Dec. 26, 2018  (JP) ................................ 2018-242029

(51) Int. Cl.
G06K 9/00      (2022.01)
G06T 3/4038    (2024.01)
G06T 7/70      (2017.01)
G06V 40/12     (2022.01)

(52) U.S. Cl.
CPC ........ G06V 40/1335 (2022.01); G06T 3/4038 (2013.01); G06T 7/70 (2017.01); *G06F 2218/10* (2023.01)

(58) Field of Classification Search
CPC ............ G06V 40/1335; G06V 10/993; G06V 40/1318; G06T 7/70; G06T 3/4038; G06F 2218/10; G06F 21/35
USPC ......................................... 340/5.82; 382/115
See application file for complete search history.

(56) References Cited

U.S. PATENT DOCUMENTS 9,684,815 B2    6/2017  Walch et al.
2006/0002595 A1  1/2006  Hara et al.
2006/0023921 A1  2/2006  Saitoh et al.
(Continued)

FOREIGN PATENT DOCUMENTS

CN     101751672 A    6/2010
JP     H103531 A      1/1998
(Continued)

OTHER PUBLICATIONS

Chinese Office Action for CN Application No. 201980092581.7 mailed on Sep. 9, 2022 with English Translation.
(Continued)

*Primary Examiner* — Abdul-Samad A Adediran

(57) ABSTRACT

An information processing apparatus of the disclosure includes: an acquisition unit that acquires a plurality of captured images each including a reference member, which has a known shape, and a subject; and a composition unit that generates one composite image from the plurality of captured images based on the shape of the reference member included in each of the plurality of captured images.

13 Claims, 11 Drawing Sheets

(56) References Cited

U.S. PATENT DOCUMENTS

| | | | |
|---|---|---|---|
| 2006/0239514 A1* | 10/2006 | Watanabe | G06V 40/1335 |
| | | | 340/5.82 |
| 2008/0031531 A1 | 2/2008 | Hara | |
| 2013/0028488 A1* | 1/2013 | Abe | G06V 10/993 |
| | | | 382/115 |
| 2016/0019673 A1 | 1/2016 | Sakamoto | |
| 2017/0255809 A1* | 9/2017 | Huang | G06V 40/1318 |
| 2019/0087556 A1* | 3/2019 | Lee | G06F 21/35 |

FOREIGN PATENT DOCUMENTS

| | | |
|---|---|---|
| JP | H10-170227 A | 6/1998 |
| JP | 2000067208 A | 3/2000 |
| JP | 2000268162 A | 9/2000 |
| JP | 2005202798 A | 7/2005 |
| JP | 2006018731 A | 1/2006 |
| JP | 2006197981 A | 8/2006 |
| JP | 2008040693 A | 2/2008 |
| JP | 2010072813 A | 4/2010 |
| JP | 2010258897 A | 11/2010 |
| JP | 2011070579 A | 4/2011 |
| JP | 2013084130 A | 5/2013 |
| JP | 2016-152605 A | 8/2016 |
| KR | 2013-0084413 A | 7/2013 |
| WO | 2014136369 A1 | 2/2017 |

OTHER PUBLICATIONS

International Search Report for PCT Application No. PCT/JP2019/050709, mailed on Mar. 31, 2020.

English translation of Written opinion for PCT Application No. PCT/JP2019/050709, mailed on Mar. 31, 2020.

Extended European Search Report for EP Application No. EP19902155.1 dated on Jan. 7, 2022.

Noh Donghyun et al, "Empirical study on touchless fingerprint recognition using a phone camera", Journal of Electronic Imaging, SPIE—International Society for Optical Engineering, US, vol. 27, No. 3, May 1, 2018 (May 1, 2018), p. 33038.

Debayan Deb et al, "Matching Fingerphotos to Slap Fingerprint Images", arxiv.org, Cornell University Library, 201, Olin Library Cornell University Ithaca, NY 14853, Apr. 22, 2018 (Apr. 22, 2018).

Schuch Patrick et al, "Survey on the impact of fingerprint image enhancement", IET Biometrics, IEEE, Michael Faraday House, Six Hills Way, Stevenage, Herts. SG1 2AY, UK, vol. 7, No. 2, Mar. 1, 2018 (Mar. 1, 2018), pp. 102-115.

* cited by examiner

FINGERPRINT IMAGE INFORMATION

| Image ID | Capturing date | Capturing place | Fingerprint image | ... |
|---|---|---|---|---|
| 00101 | [DATE_1] | [PL_1] | | ... |
| 00102 | [DATE_2] | [PL_2] | | ... |
| 00103 | [DATE_3] | [PL_3] | | ... |
| ... | ... | ... | ... | ... |

INFORMATION PROCESSING APPARATUS, INFORMATION PROCESSING METHOD, AND STORAGE MEDIUM

This application is a National Stage Entry of PCT/JP2019/050709 filed on Dec. 24, 2019, which claims priority from Japanese Patent Application 2018-242029 filed on Dec. 26, 2018, the contents of all of which are incorporated herein by reference, in their entirety.

TECHNICAL FIELD

The disclosure relates to an information processing apparatus, an information processing method, and a storage medium.

BACKGROUND ART

Patent Literature 1 discloses an image processing apparatus that corrects a missing portion due to reflected light or shade by composing a plurality of captured images including a subject after performing image processing on each of the images. Patent Literature 1 further discloses performing a process such as reshaping, scaling, or the like before composing a plurality of captured images.

CITATION LIST

Patent Literature

PTL 1: Japanese Patent Application Laid-Open No. 2010-72813

SUMMARY OF INVENTION

Technical Problem

In the technique disclosed in Patent Literature 1, however, accuracy of a composite image may be reduced when an unsuitable correction process is performed in composing a plurality of captured images.

Accordingly, in view of the problem described above, the example object of the disclosure is to provide an information processing apparatus, an information processing method, and a storage medium that can compose a plurality of images at high accuracy.

Solution to Problem

According to one example aspect of the disclosure, provided is an information processing apparatus including: an acquisition unit that acquires a plurality of captured images each including a reference member, which has a known shape, and a subject; and a composition unit that generates one composite image from the plurality of captured images based on the shape of the reference member included in each of the plurality of captured images.

According to another example aspect of the disclosure, provided is an information processing method including: acquiring a plurality of captured images each including a reference member, which has a known shape, and a subject; and generating one composite image from the plurality of captured images based on the shape of the reference member included in the captured images.

According to yet another example aspect of the disclosure, provided is a storage medium storing a program that causes a computer to perform: acquiring a plurality of captured images each including a reference member, which has a known shape, and a subject; and generating one composite image from the plurality of captured images based on the shape of the reference member included in the captured images.

Advantageous Effects of Invention

According to the disclosure, an information processing apparatus, an information processing method, and a storage medium that can compose a plurality of images at high accuracy are provided.

DESCRIPTION OF EMBODIMENTS

Exemplary example embodiments of the disclosure will be described below with reference to the drawings. Throughout the drawings, similar features or corresponding features are labeled with the same references, and the description thereof may be omitted or simplified.

First Example Embodiment

Figure 1:
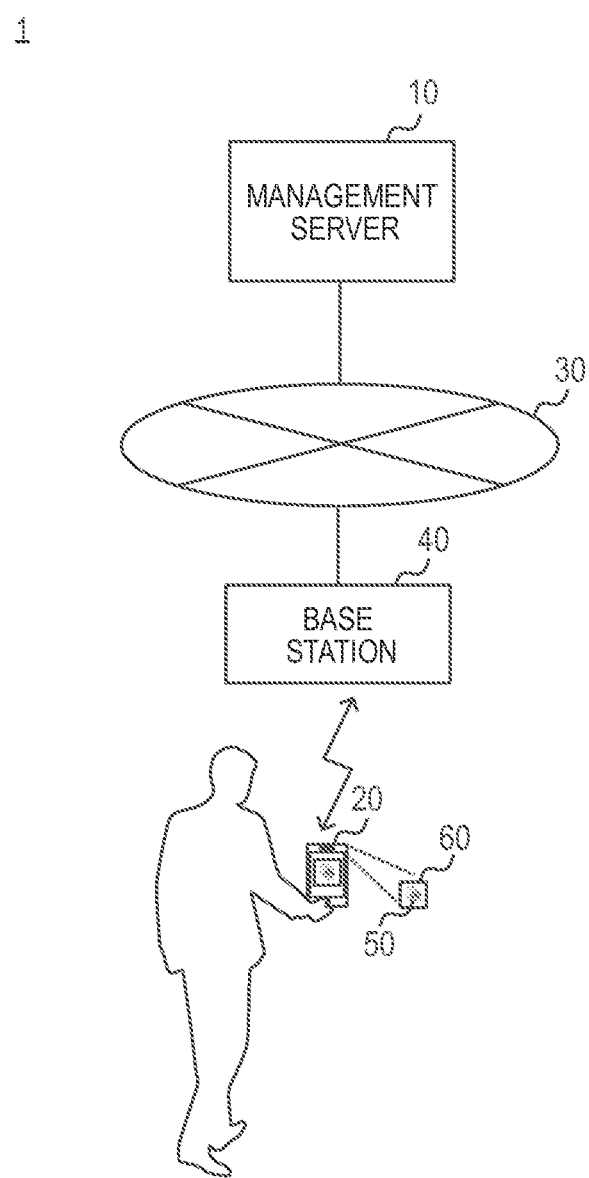
FIG. 1 is a block diagram illustrating an overall configuration example of an image management system in a first example embodiment.

First, the configuration of an image management system 1 in the example embodiment will be described with reference to FIG. 1 to FIG. 5. FIG. 1 is a block diagram illustrating an overall configuration example of the image management system 1 in the example embodiment. The image management system 1 is an information processing system including a management server 10 and a user terminal 20. The management server 10 and the user terminal 20 are connected to a network 30 such as a local area network (LAN) or the Internet. In the example of FIG. 1, the user terminal 20 performs wireless communication with a base station 40 and is connected to the network 30 via the base station 40.

The management server 10 is an information processing apparatus that registers and manages images of dermatoglyphic patterns transmitted from the user terminal 20. A dermatoglyphic pattern is a general term of a fingerprint, a palm print, a sole print, and the like. Dermatoglyphic patterns vary from person to person and thus have been widely used for examination or authentication of a person. Note that, although the term "dermatoglyphic pattern" in the example embodiment means a fingerprint image of a person, the configuration of the example embodiment is applicable to images of other dermatoglyphic patterns in the same manner.

The user terminal 20 is a portable terminal apparatus having an image capture function and a wireless communication function. The user terminal 20 may be, for example, a smartphone, a tablet terminal, a camera-equipped mobile phone, or the like. The user terminal 20 of the example embodiment is a smartphone and is used for simultaneously capturing images of a fingerprint 50 and a reference member 60 surrounding the fingerprint 50. The reference member 60 is a scale member having a known shape (for example, a square of 5 cm on each side), and the material thereof is not limited.

Figure 2:
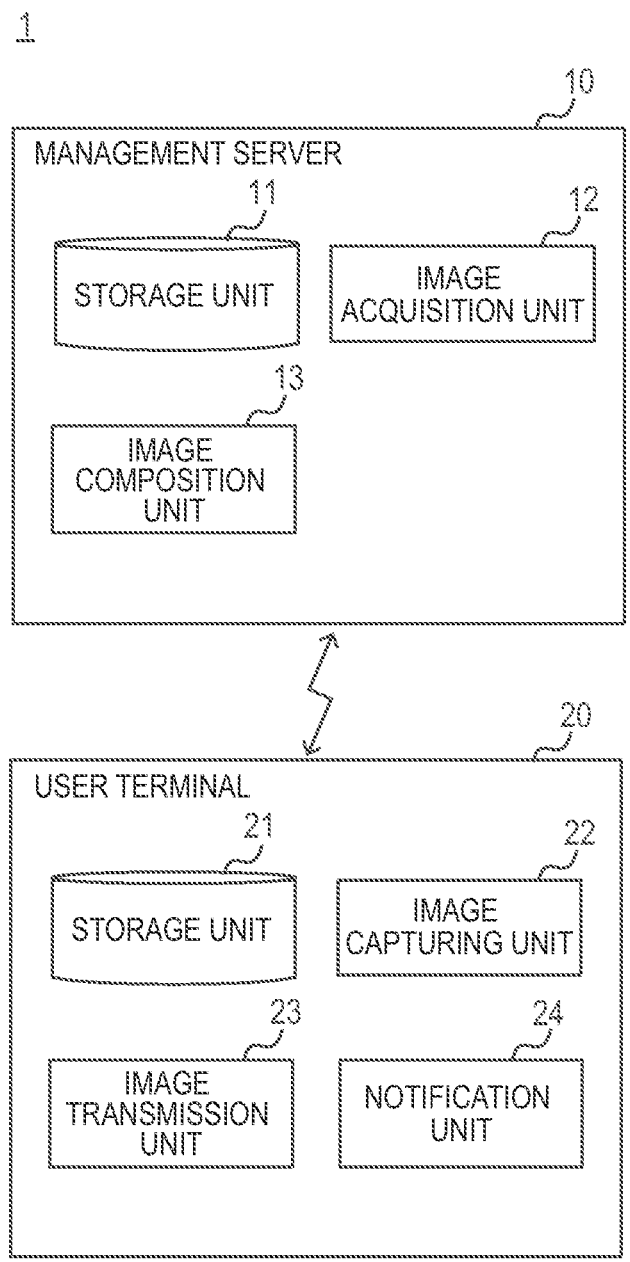
FIG. 2 is a block diagram illustrating a function of the image management system in the first example embodiment.

FIG. 2 is a block diagram illustrating a function of the image management system 1 in the example embodiment. In this example, the management server 10 has a storage unit 11, an image acquisition unit 12, and an image composition unit 13.

Figures 3, 4A:
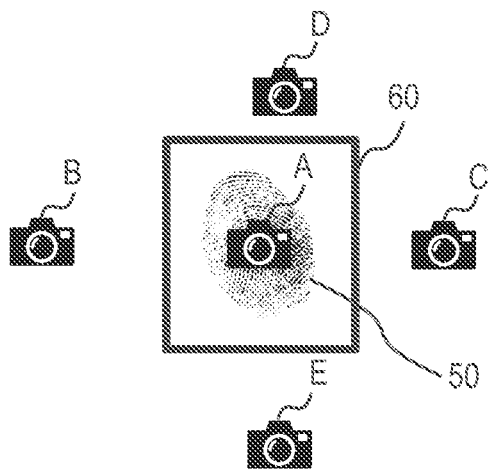
FIG. 3 is a diagram illustrating an example of fingerprint image information stored in a storage unit in the first example embodiment.
FIG. 4A is a diagram illustrating a method of generating a fingerprint image in the first example embodiment.

The storage unit 11 stores captured images collected from the user terminal 20, a composite image composed from a plurality of captured images, attribute information on images, and the like. FIG. 3 is a diagram illustrating an example of fingerprint image information stored in the storage unit 11 in the example embodiment. In this example, image IDs, capturing dates, capturing places, and fingerprint images are provided as data items of fingerprint image information. However, data items are not limited thereto and may further include names of registered persons associated with fingerprint images, IDs of image-capturing persons, feature amounts of fingerprints, file names of a plurality of captured images used in a composition process, or the like.

The image acquisition unit 12 acquires a plurality of captured images each including the reference member 60 having a known shape and a subject (fingerprint 50) from the user terminal 20 via the network 30. The image acquisition unit 12 stores the plurality of acquired captured images in the storage unit 11.

The image composition unit 13 generates one composite image from a plurality of captured image based on the shape of the reference member 60 included in each of the plurality of captured images. The plurality of captured images are images captured from capturing positions (capturing angles, capturing distances) that are different from each other, for example.

Further, the image composition unit 13 generates a composite image by composing a plurality of captured images after reshaping each of the plurality of captured images so that the shape of the reference member 60 within a captured image matches the shape of the reference member 60 viewed from the front (directly above).

Further, the image composition unit 13 generates a composite image by selecting and composing captured images that satisfy a predetermined capturing condition out of a plurality of captured images. The capturing condition includes at least one of a capturing position and a reflecting region of illumination light. Specific examples of the capturing condition may provide: (A) when multiple times of capturing are performed and when there are captured images having close capturing angles, selecting only some of the images; (B) excluding images in which whiteout occurs much due to illumination light and selecting only images having a high capturing quality; (C) selecting only the captured images required for supplementing a missing region of one captured image, and the like.

The image composition unit 13 supplements a missing region in one captured image with a pixel value of a corresponding region in another captured image when each of a plurality of captured images includes a different missing region. Next, a method of generating a fingerprint image and a method of supplementing a missing region will be described.

FIG. 4A to FIG. 4D are diagrams illustrating a method of generating a fingerprint image in the example embodiment. FIG. 4A illustrates capturing an image of the fingerprint 50 and a reference member 60 from different capturing positions with the fingerprint 50 being surrounded by the reference member 60. In this example, there are five capturing positions: a front (directly above) position A, a left diagonally upward position B, a right diagonally upward position C, a front diagonally upward position D, and a rear diagonally upward position E.

Figure 4B:
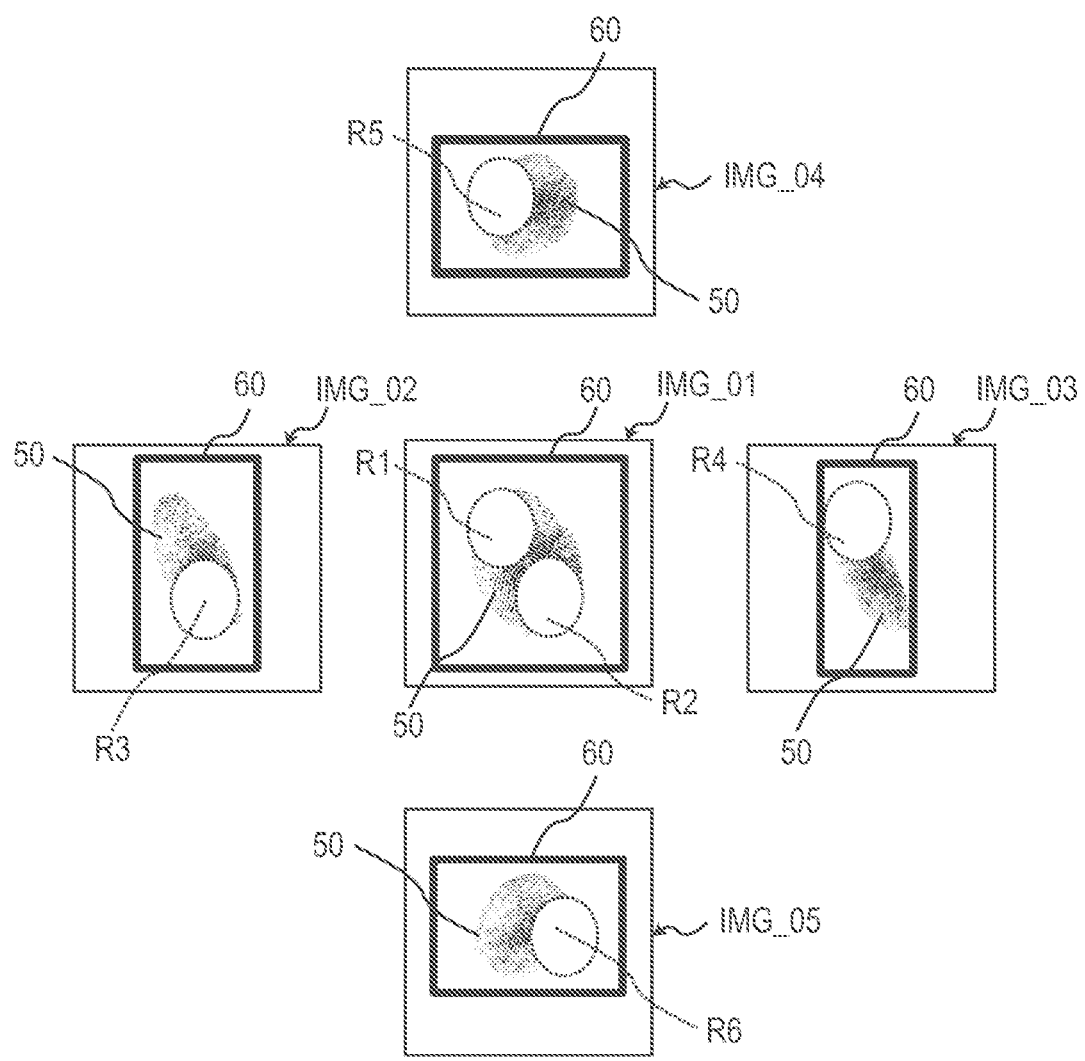
FIG. 4B is a diagram illustrating the method of generating a fingerprint image in the first example embodiment.

FIG. 4B illustrates captured images IMG_01 to IMG_05 captured at the five capturing positions A to E of FIG. 4A, respectively. Further, the region surrounded by a dashed line in FIG. 4B indicates a missing region in which whiteout occurs due to reflection of illumination light.

In the captured image IMG_01 of the fingerprint 50 and the reference member 60 captured from the front position A, a missing region R1 is included in the upper left of the fingerprint 50, and a missing region R2 is included in the lower right. Similarly, a missing region R3 is included in the lower side of the fingerprint 50 in the captured image IMG_02 taken from the left diagonally upward position B. A missing region R4 is included in the upper side of the fingerprint 50 in the captured image IMG_03 taken from the right diagonally upward position C. A missing region R5 is included in the left side of the fingerprint 50 in the captured image IMG_04 taken from the front diagonally upward position D. Further, a missing region R6 is included in the right side of the fingerprint 50 in the captured image IMG_05 taken from the rear diagonally upward position E. In such a way, each of the five images includes a missing region, and no complete fingerprint image is obtained.

Figure 4C:
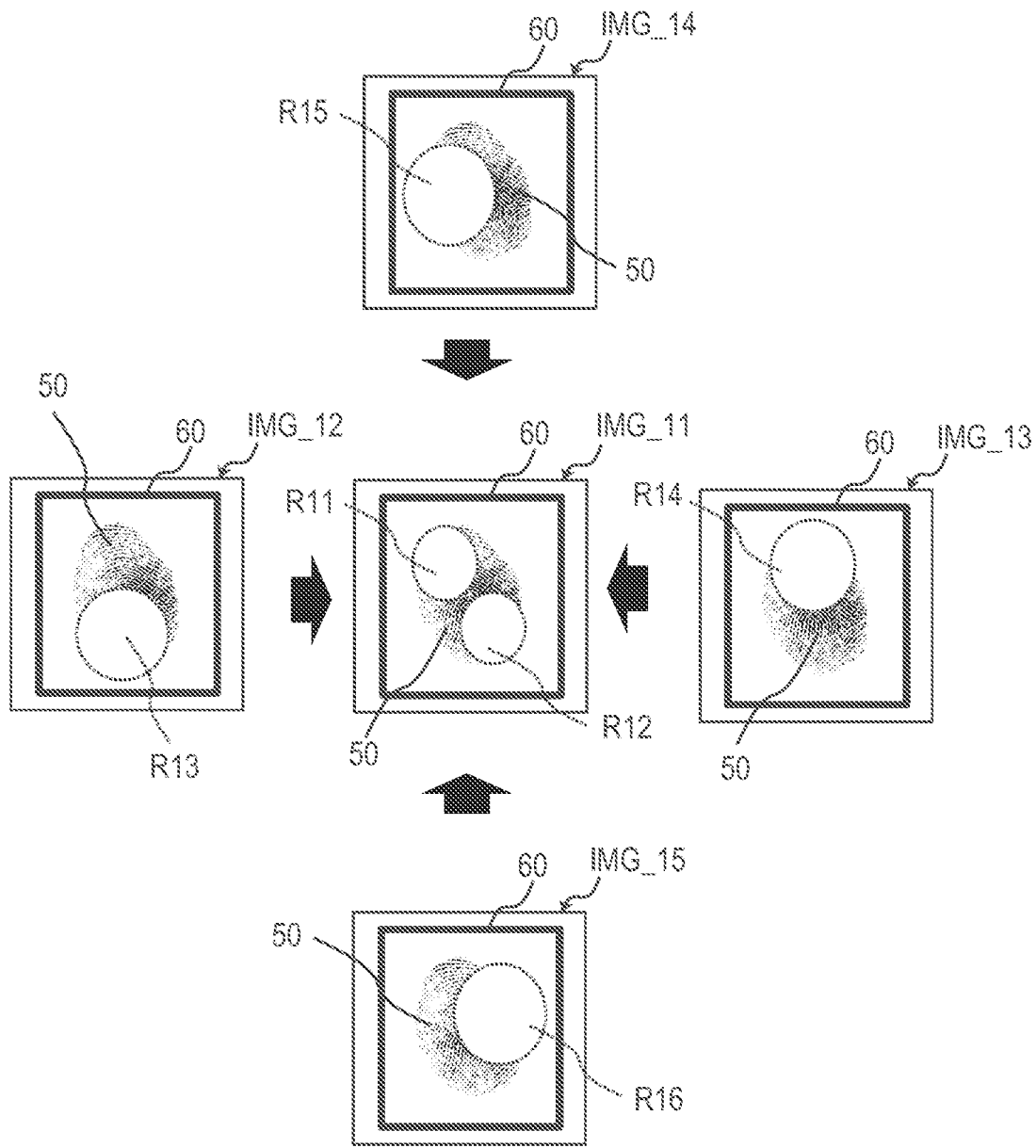
FIG. 4C is a diagram illustrating the method of generating a fingerprint image in the first example embodiment.

FIG. 4C illustrates corrected images IMG_11 to IMG_15 obtained by performing a reshaping process on the captured images IMG_01 to IMG_05 illustrated in FIG. 4B. Each of the captured images IMG_01 to IMG_05 is reshaped by using, as a reference value, a displayed shape (including the size) indicated by the reference member 60 obtained when the reference member 60 is captured from the front, directly above position.

The corrected image IMG_11 is an image reshaped from the captured image IMG_01 based on the reference value, and the fingerprint 50, the reference member 60, and the missing regions R1 and R2 in the corrected image IMG_11 have been expanded at a constant rate. That is, missing regions R11 and R12 in the corrected image IMG_11 correspond to the missing regions R1 and R2 in the captured image IMG_01, respectively. Similarly, the corrected image IMG_12 is an image reshaped from the captured image IMG_02 based on the reference value, and the fingerprint 50, the reference member 60, and the missing region R3 in the corrected image IMG_12 have been expanded at a constant rate mainly in the lateral direction. That is, a missing region R13 in the corrected image IMG_12 corresponds to the missing region R3 in the captured image IMG_02.

The corrected image IMG 13 is an image reshaped from the captured image IMG_03 based on the reference value, and the fingerprint 50, the reference member 60, and the missing region R4 in the corrected image IMG 13 have been expanded at a constant rate mainly in the lateral direction. That is, a missing region R14 in the corrected image IMG 13 corresponds to the missing region R4 in the captured image IMG_03. Since the lateral length of the reference member 60 within the captured image IMG_03 is shorter than the length of the reference member 60 within the captured image IMG_02, the expansion ratio is larger in the captured image IMG_03.

The corrected image IMG_14 is an image reshaped from the captured image IMG_04 based on the reference value, and the fingerprint 50, the reference member 60, and the missing region R5 in the corrected image IMG_14 have been expanded at a constant rate mainly in the vertical direction. That is, a missing region R15 in the corrected image IMG_14 corresponds to the missing region R5 in the captured image IMG_04. Similarly, the corrected image IMG_15 is an image reshaped from the captured image IMG_05 based on the reference value, and the fingerprint 50, the reference member 60, and the missing region R6 in the corrected image IMG_15 have been expanded at a constant rate mainly in the vertical direction. That is, a missing region R16 in the corrected image IMG_15 corresponds to the missing region R6 in the captured image IMG_05. Since the vertical length of the reference member 60 within the captured image IMG_04 is substantially the same as the length of the reference member 60 within the captured image IMG_02, the expansion ratio is substantially the same between these images.

Figure 4D:
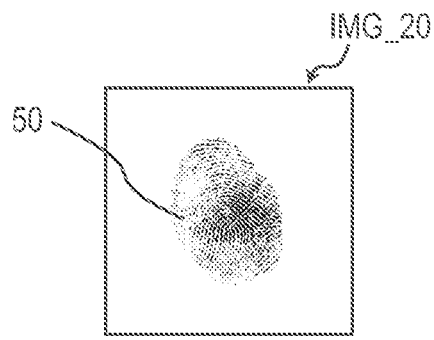
FIG. 4D is a diagram illustrating the method of generating a fingerprint image in the first example embodiment.

The missing regions R11 to R16 in the corrected images IMG_11 to IMG_15 differ from each other, and it is possible to eliminate the missing region by overlapping these images. That is, when the corrected images IMG_11 to IMG_15 are composed, a missing region of one image can be supplemented by a pixel value of a corresponding region of another image. FIG. 4D illustrates a composite image IMG_20 composed by the reshaping and overlapping of the plurality of captured images IMG_01 to IMG_05. As illustrated in the composite image IMG_20, a composite image can be generated at high accuracy even when missing regions are included in the captured images IMG_01 to IMG_05.

Further, as illustrated in FIG. 2, the user terminal 20 has a storage unit 21, an image capturing unit 22, an image transmission unit 23, and a notification unit 24.

The storage unit 21 stores a program or a file required for the operation of the user terminal 20, processed data in the user terminal 20, or the like. The image capturing unit 22 is an image capturing application that controls driving of an image capturing device 259 described later and performs a process of capturing a still image or a moving image of a subject.

The image transmission unit 23 transmits a captured image to a management server 10 in response to completion of an image capturing process in the image capturing unit 22. Although the image transmission unit 23 collectively transmits a plurality of captured images captured from different capturing positions for one fingerprint in the example embodiment, such captured images may be transmitted sequentially on a captured image basis. In any of the cases, when the captured object is the same, to determine the relationship between a plurality of captured images on the management server 10 side, an ID that identifies the captured object is included in transmission data of captured images.

The notification unit 24 outputs guidance information related to image capturing to a display device 256 described later during image capturing. A specific example of guidance information may be a message specifying a predetermined capturing position, the number of times of image capturing, or the like for the user.

Figure 5:
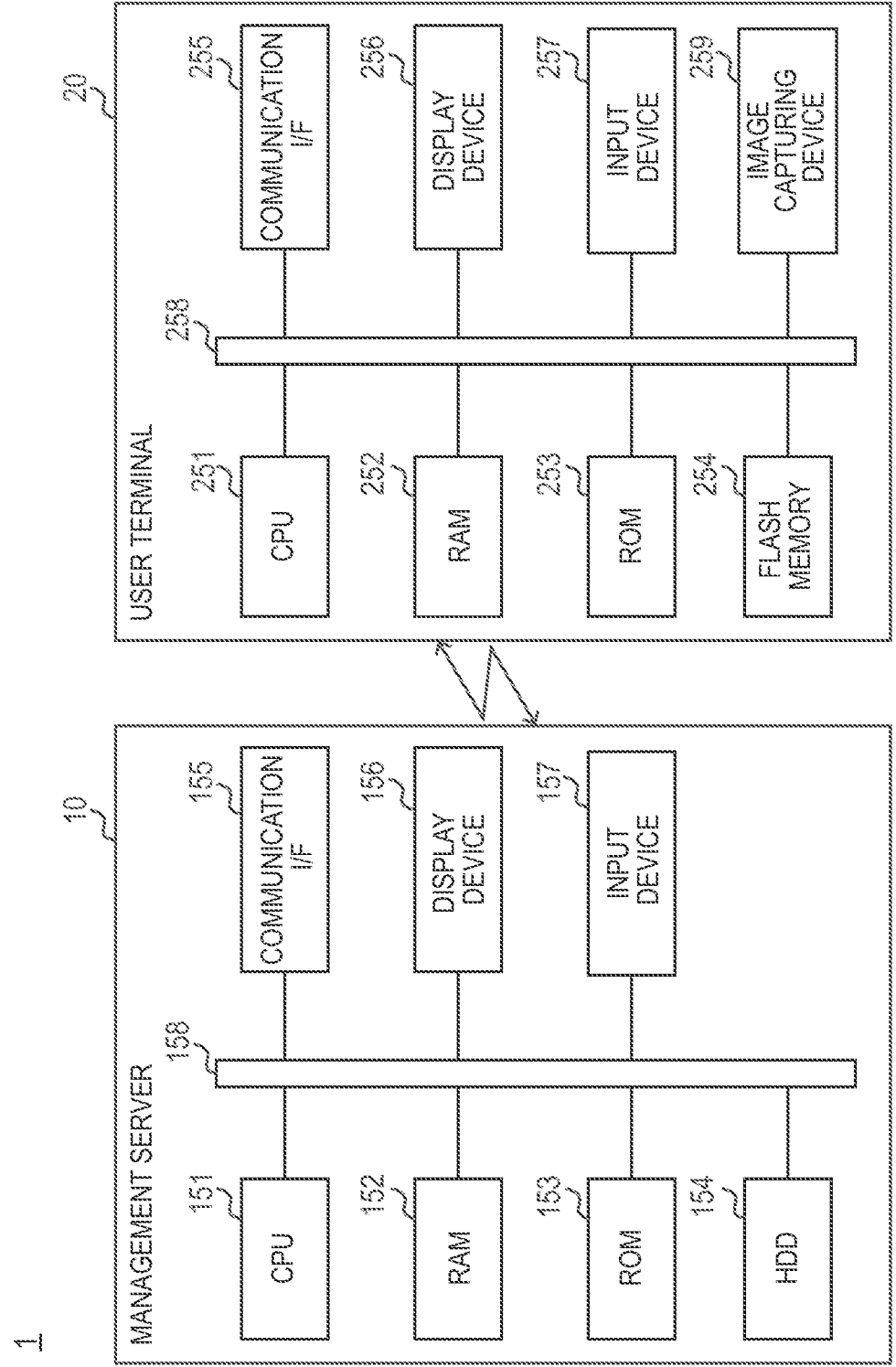
FIG. 5 is a block diagram illustrating a hardware configuration example of a management server and a user terminal in the first example embodiment.

FIG. 5 is a block diagram illustrating a hardware configuration example of the management server 10 and the user terminal 20 in the example embodiment. The management server 10 has a central processing unit (CPU) 151, a random access memory (RAM) 152, a read only memory (ROM) 153, and a hard disk drive (HDD) 154 as a computer that performs calculation, control, and storage. Further, the management server 10 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via drive devices (not illustrated) that drive these devices.

The CPU 151 is a processor having a function of performing a predetermined operation in accordance with a program stored in the ROM 153, the HDD 154, or the like and controlling each unit of the management server 10. The RAM 152 is formed of a volatile storage medium and provides a temporary memory region required for the operation of the CPU 151. The ROM 153 is formed of a nonvolatile storage medium and stores necessary information such as a program used for the operation of the management server 10. The HDD 154 is formed of a nonvolatile storage medium and is a storage device that stores data required for processing, an operating program of the management server 10, or the like.

The communication I/F 155 is a communication interface based on the specification such as Ethernet (registered trademark), Wi-Fi (registered trademark), 4G, or the like and is a module used for communicating with other devices. The display device 156 is a liquid crystal display, an OLED display, or the like and is used for displaying an image, a text, interface, or the like. The input device 157 is a keyboard, a pointing device, or the like and is used by the user to operate the management server 10. The example of the pointing device may be a mouse, a trackball, a touch panel, a pen tablet, or the like. The display device 156 and the input device 157 may be integrally formed as a touch panel.

The CPU 151 loads a program stored in the ROM 153, the HDD 154, or the like into the RAM 152 and executes the program. Thereby, the CPU 151 implements the function of the image acquisition unit 12, the image composition unit 13, and the like described above. Furthermore, the CPU 151 implements the function of the storage unit 11 by controlling the HDD 154.

Further, the user terminal 20 has a CPU 251, a RAM 252, a ROM 253, a communication I/F 255, a display device 256, and an input device 257 as a computer that performs calculation, control, and storage. Since these devices are the same as the CPU 151, the RAM 152, the ROM 153, the communication I/F 155, the display device 156, and the input device 157 of the management server 10, the detailed description thereof will be omitted. Further, the user terminal 20 of the example embodiment is a smartphone and thus has a flash memory 254 instead of the HDD 154 as a mass storage region. Further, the user terminal 20 further has an image capturing device 259 such as a digital camera that can capture a still image and a moving image. The CPU 251, the RAM 252, the ROM 253, the communication I/F 255, the display device 256, the input device 257, the flash memory 254, and the image capturing device 259 are connected to each other via the bus 258.

The CPU 251 loads a program stored in the ROM 253 or the like into the RAM 252 and executes the program. Thereby, the CPU 251 implements the function of the image capturing unit 22, the image transmission unit 23, the notification unit 24, and the like described above. Furthermore, the CPU 251 implements the function of the storage unit 21 by controlling the flash memory 254.

Note that the hardware configuration illustrated in FIG. 5 is an example, and a device other than the above may be added, or some of the devices may be omitted. Further, some of the devices may be replaced with another device having the same function. Further, a part of the function of the example embodiment may be provided by another device via the network 30, and the function of the example embodiment may be distributed and implemented in a plurality of devices. For example, the HDD 154 may be replaced with a solid state drive (SSD) using a semiconductor memory or may be replaced with a cloud storage.

Figure 6:
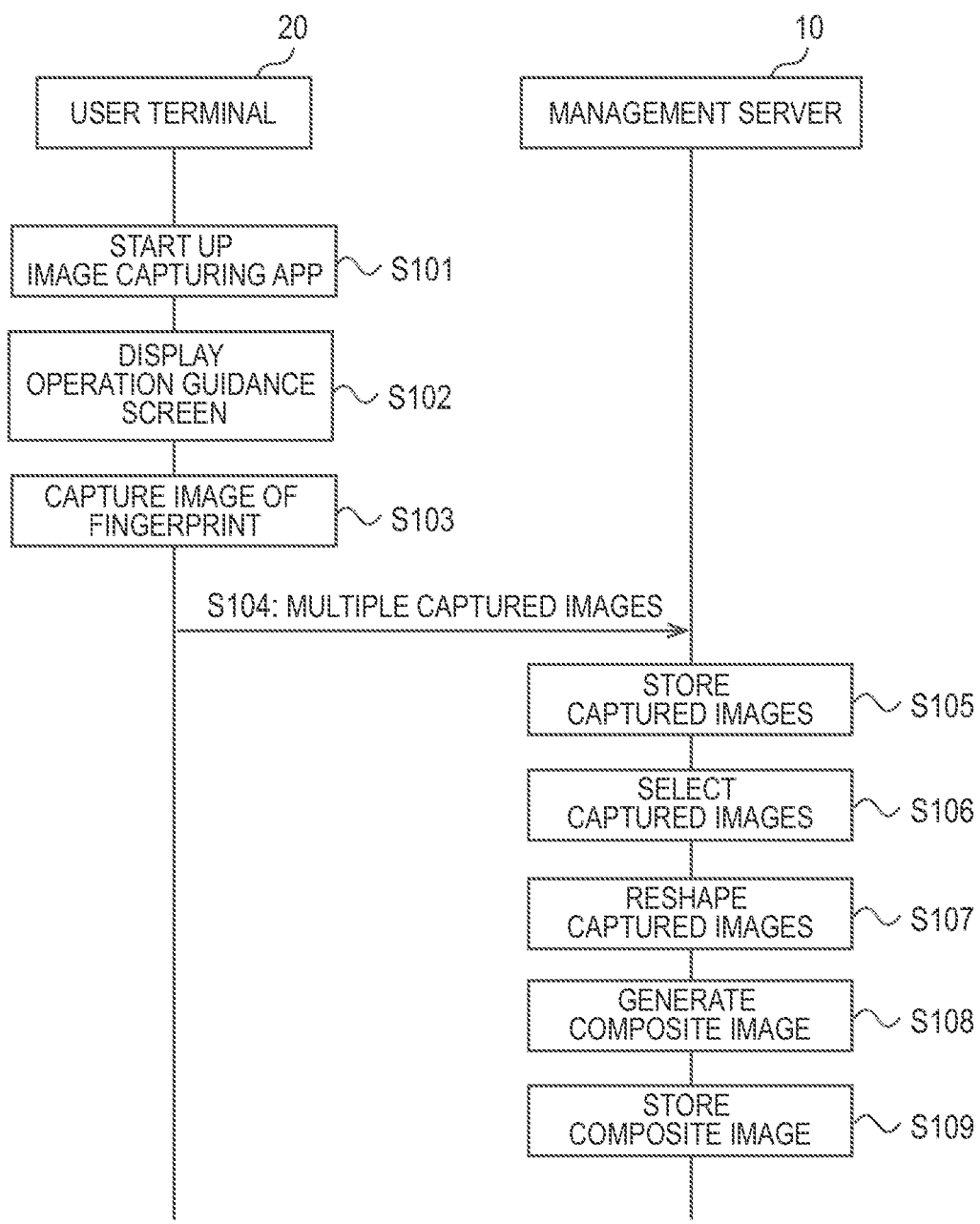
FIG. 6 is a sequence diagram illustrating an example of a process in the image management system in the first example embodiment.

Next, an image registration process in the image management system 1 configured as described above will be described. FIG. 6 is a sequence diagram illustrating an example of the process in the image management system 1 in the example embodiment.

First, the user terminal 20 (the image capturing unit 22) starts up a fingerprint image capturing application (hereafter, referred to as "image capturing app") based on a user operation (step S101) and then displays an operation guidance screen on the display device 256 (step S102).

Figure 7:
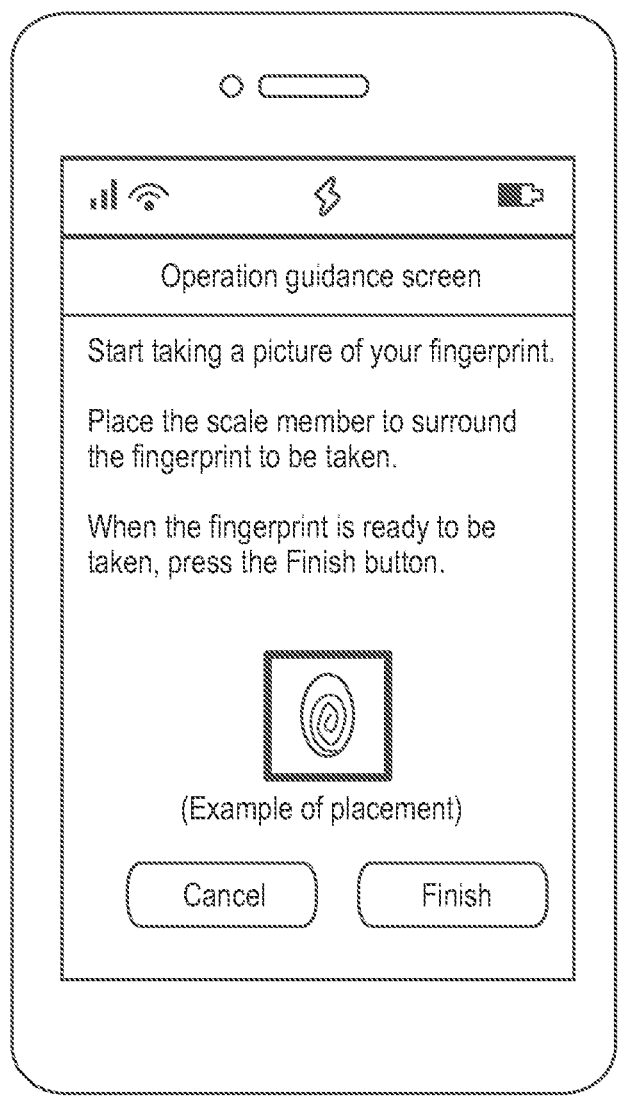
FIG. 7 is a diagram illustrating an example of an operation guidance screen displayed on the user terminal in the first example embodiment.

FIG. 7 is a diagram illustrating an example of the operation guidance screen displayed on the user terminal 20 in the example embodiment. In this example, the operation guidance screen displays an example of placement of the reference member 60 with respect to the fingerprint 50 that is a subject and a guidance message related to start of image capturing ("Start taking a picture of your fingerprint. Place the scale member to surround the fingerprint to be taken. When the fingerprint is ready to be taken, press the Finish button."). Note that, when the finish button is pressed, if a guidance message that guides the capturing position or the number of times of capturing for captured images required for generating a composite image (for example, "Next, take a picture of the fingerprint from a position left-above to the scale member." or the like) is displayed in accordance with the capturing status, this is preferable because the image capturing efficiency at the user is improved.

Next, the user terminal 20 (the image capturing unit 22) captures images of the fingerprint 50 and the reference member 60 together from different capturing positions with the reference member 60 being placed so as to surround the fingerprint 50 (step S103) and obtains a plurality of captured images.

Next, the user terminal 20 (the image transmission unit 23) associates the plurality of captured images with a common image ID and collectively transmits the captured images to the management server 10 (step S104). Note that the user terminal 20 may transmit the captured images to the management server 10 one by one. The management server 10 (the image acquisition unit 12) stores the plurality of captured images received from the user terminal 20 in the HDD 154 (the storage unit 11) (step S105).

Next, the management server 10 (image composition unit 13) analyzes the positional relationship of the reference member 60 and the fingerprint 50 included in the plurality of captured images and selects only the images satisfying a predetermined capturing condition (step S106). Note that description will be provided below assuming that the plurality of images satisfy a condition and have been selected. When no image satisfies a capturing condition, error information can be output to the user terminal 20.

Next, the management server 10 (the image composition unit 13) reshapes each of the plurality of captured images so that the shape of the reference member 60 within a captured image matches the shape of the reference member 60 viewed from the front (directly above) (step S107) and then generates a composite image by overlapping the plurality of reshaped corrected images (step S108).

The management server 10 (the image composition unit 13) then stores the generated composite images in the HDD 154 (the storage unit 11) in association with an image ID (step S109). The fingerprint image stored in the HDD 154 (the composite image) is used for some matching process or the like.

As described above, in the image management system 1 in the example embodiment, the management server 10 collects a plurality of captured images acquired from the user terminal 20, reshapes the captured images based on the positional relationship between the fingerprint 50 and the reference member 60 within each captured image, and performs a composition process. That is, since a plurality of captured images can be reshaped at high accuracy, respectively, based on the shape of the reference member 60 having a known shape, a composite image can be generated at high accuracy as a result.

Further, a plurality of captured images in the example embodiment are images captured from capturing positions different from each other. Accordingly, even when a captured image taken from a particular capturing position is of low quality, a composite image can be generated at high accuracy as long as a captured image taken from another capturing position is of high quality.

Further, the management server 10 (the image composition unit 13) of the example embodiment generates a composite image by reshaping each of a plurality of captured images so that the shape of the reference member 60 within a captured image matches the shape of the reference member 60 viewed from the front (directly above) and then composing the plurality of captured images. Since the shape of the reference member 60 used as a reference in the reshaping process is predefined, the process can be performed at high accuracy and at a high speed.

Further, the management server 10 (the image composition unit 13) of the example embodiment generates a composite image by selecting and composing captured images that satisfy a predetermined capturing condition out of the plurality of captured images. Accordingly, since it is possible to exclude a captured image not required for a composition process, it is possible to generate a composite image at high accuracy and at a high speed.

Further, the management server 10 (the image composition unit 13) of the example embodiment supplements a missing region in one captured image with a pixel value of a corresponding region in another captured image when a plurality of captured images include different missing regions, respectively. Accordingly, even when some of captured images include a missing region, it is possible to supplement the missing region with other captured images to generate a composite image at high accuracy.

Furthermore, although the case where the subject is the fingerprint 50 has been described in the example embodiment, the subject may be other dermatoglyphic patterns of a person. When the subject is a dermatoglyphic pattern (a pattern on the skin), an advantageous effect of being able to acquire a feature point supposed to be included in the subject is obtained by acquiring a plurality of defective images in which a part of a feature point used in fingerprint matching is missed due to whiteout or the like. Further, in examination and authentication of a dermatoglyphic pattern of a person, since a fingerprint image is required to be of high accuracy, it is particularly preferable to use the image management system 1 of the example embodiment for image registration of a dermatoglyphic pattern. Note that the configuration of the image management system 1 in the example embodiment is also applicable in image registration of any object.

Second Example Embodiment

An image management system 2 in a second example embodiment will be described below. Note that references common to the references provided in the drawings in the first example embodiment indicate the same components. The description of features common to those of the first example embodiment will be omitted, and different features will be described in detail.

In the first example embodiment described above, the correction and composition processes of images are performed on the management server 10 side. In contrast, the example embodiment differs from the first example embodiment in that a composite image is transmitted to the management server 10 after the correction and composition processes of images are performed on the user terminal 20 side.

Figure 8:
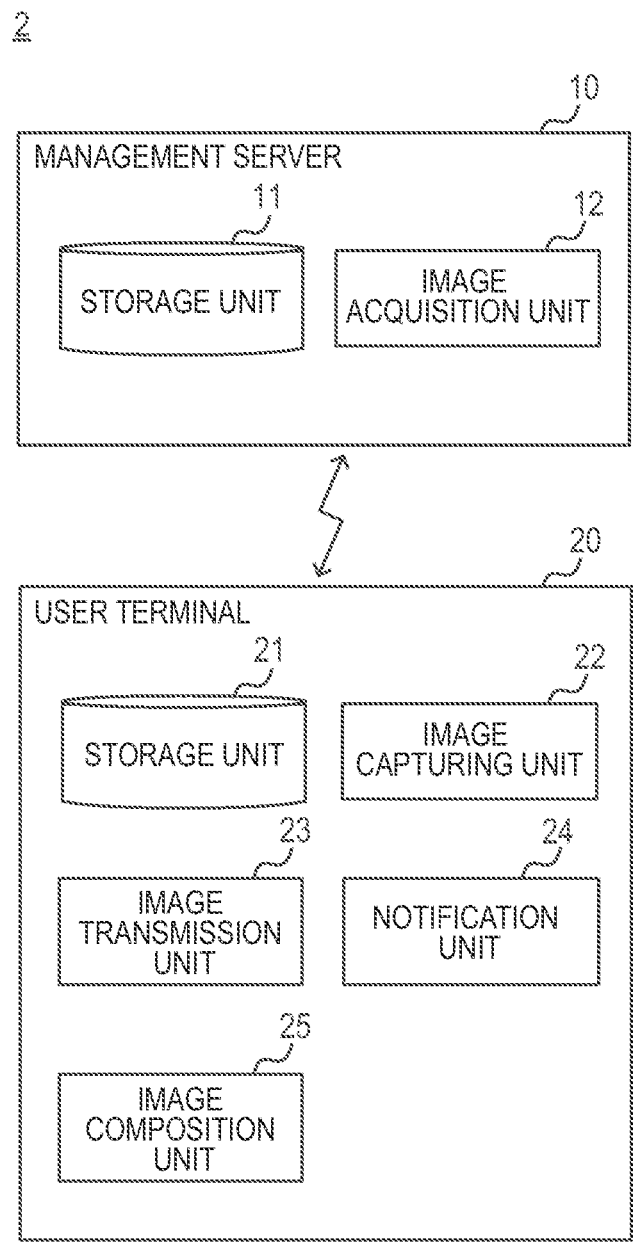
FIG. 8 is a block diagram illustrating a function of an image management system in a second example embodiment.

FIG. 8 is a block diagram illustrating the function of the image management system 2 in the example embodiment. As illustrated in FIG. 8, the image composition unit 13 of FIG. 2 is removed from the management server 10. Instead, the user terminal 20 further has an image composition unit 25. Since the function of the image composition unit 25 is the same as the function of the image composition unit 13 of the first example embodiment, the detailed description thereof will be omitted.

Figure 9:
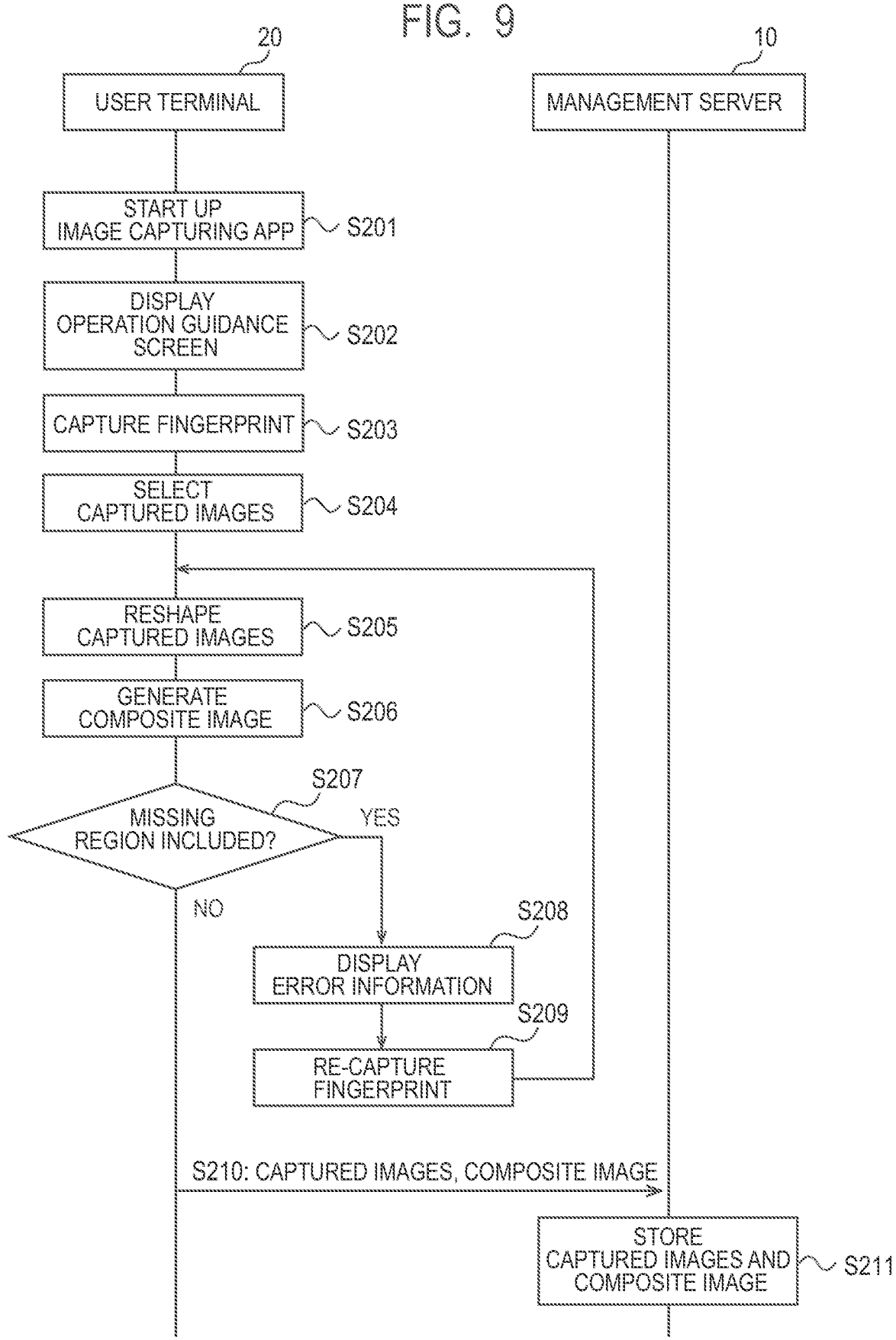
FIG. 9 is a sequence diagram illustrating an example of a process in the image management system in the second example embodiment.

Next, an image registration process in the image management system 2 configured as described above will be described. FIG. 9 is a sequence diagram illustrating an example of the process in the image management system 2 in the example embodiment.

First, the user terminal 20 (the image capturing unit 22) starts up the fingerprint image capturing app based on a user operation (step S201) and then displays an operation guidance screen (see FIG. 7) on the display device 256 (step S202).

Next, the user terminal 20 (the image capturing unit 22) captures images of the fingerprint 50 and the reference member 60 together from different capturing positions with the reference member 60 being placed so as to surround the fingerprint 50 (step S203) and obtains a plurality of captured images.

Next, the user terminal 20 (the image composition unit 25) analyzes the positional relationship of the reference member 60 and the fingerprint 50 included in the plurality of captured images and selects only the images satisfying a predetermined capturing condition (step S204). Note that description will be provided below assuming that the plurality of images satisfy a condition and have been selected. When no image satisfies a capturing condition, error information can be output to the display device 256, for example.

Next, the user terminal 20 (the image composition unit 25) reshapes each of the plurality of captured images so that the shape of the reference member 60 within a captured image matches the shape of the reference member 60 viewed from the front (directly above) (step S205) and then generates a composite image by overlapping the plurality of reshaped corrected images (step S206).

Next, the user terminal 20 (the image composition unit 25) performs image analysis on the composite image to determine whether or not a missing region is included in the composite image (step S207). Herein, if the user terminal 20 (the image composition unit 25) determines that a missing region is included in the composite image (step S207: YES), the process proceeds to step S208.

On the other hand, if the user terminal 20 (the image composition unit 25) determines that no missing region is included in the composite image (step S207: NO), the process proceeds to step S210.

Figure 10:
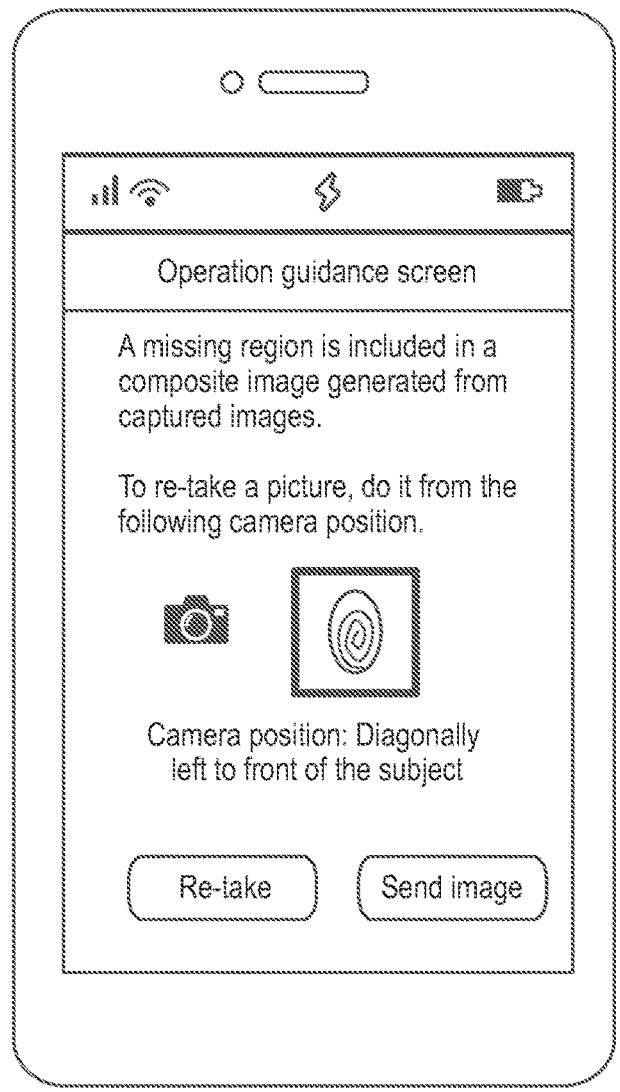
FIG. 10 is a diagram illustrating an example of an operation guidance screen displayed on a user terminal in the second example embodiment.

In step S208, the user terminal 20 (the notification unit 24) displays error information in the operation guidance screen on the display device 256. FIG. 10 is a diagram illustrating an example of the operation guidance screen displayed on the user terminal 20 in the example embodiment. In this example, it is illustrated that a message indicating that generation of a composite image failed and including instruction information on how to deal with the error ("A missing region is included in a composite image generated from captured images. To re-take a picture, do it from the following camera position.") is displayed within the screen together with an instruction view of the capturing position.

Next, in response to the user terminal 20 (the image capturing unit 22) again performing image capturing of the fingerprint 50 and the reference member 60 in accordance with an operation performed by the user who has referenced error information in the operation guidance screen (step S209), the process returns to step S205.

In step S210, the user terminal 20 (the image transmission unit 23) associates the composite image and the plurality of captured images used in the composition process with a common image ID and collectively transmits the composite image and the captured images to the management server 10. The management server 10 (the image acquisition unit 12) then stores the composite image and the plurality of captured images received from the user terminal 20 in the HDD 154 (the storage unit 11) (step S211).

Note that the process described above is a mere example, and the order of processes or a part of the processing method may be changed. For example, in step S207, even if a missing region is included, the area of the missing region is below a certain threshold, the process may proceed to step S210. Further, the user may be instructed to select an image other in a process than the process of comparison of the area of a missing region with a threshold.

As described above, in the image management system 2 in the example embodiment, since the reshaping and composition processes of captured images are performed on the user terminal 20 side, the same advantageous effects as those in the first example embodiment can be obtained. Further, if a suitable composition image is not generated from a plurality of captured images at a photographing site, error information can be displayed in the screen on the user terminal 20. It is therefore possible to urge the user to re-take a picture at the photographing site, and this enables the user to promptly take an action even if the user failed to take a picture.

Third Example Embodiment

Figure 11:
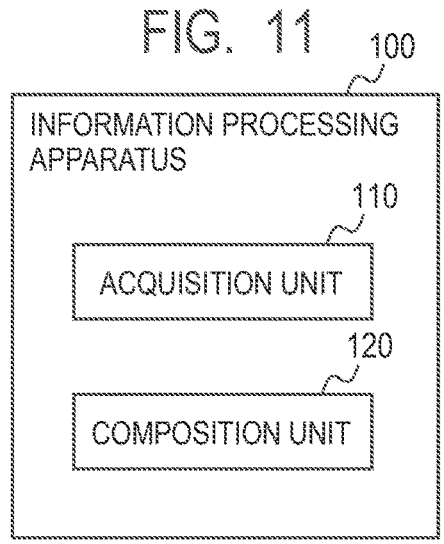
FIG. 11 is a block diagram illustrating a function of an information processing apparatus in a third example embodiment.

FIG. 11 is a block diagram illustrating the function of an information processing apparatus 100 in the example embodiment. The information processing apparatus 100 in the example embodiment includes an acquisition unit 110 that acquires a plurality of captured images each including a reference member, which has a known shape, and a subject and a composition unit 120 that generates one composite image from the plurality of captured images based on the shape of the reference member included in each of the plurality of captured images. According to the example embodiment, a plurality of images can be composed at high accuracy.

Modified Example Embodiments

Although the disclosure has been described above with reference to the example embodiments, the disclosure is not limited to the example embodiments described above. Various modifications that may be understood by those skilled in the art can be made to the configuration and details of the disclosure within the scope not departing from the spirit of the disclosure. For example, it should be understood that an example embodiment in which a part of the configuration of any of the example embodiments is added to another example embodiment or an example embodiment in which a part of the configuration of any of the example embodiments is replaced with a part of another example embodiment is also one of the example embodiments to which the disclosure may be applied.

For example, in the first example embodiment described above, the image composition unit 13 generates a composite image by composing a plurality of captured images after reshaping each of the plurality of captured images so that the shape of the reference member 60 within a captured image matches the shape of the reference member 60 viewed from the front. However, the image composition unit 13 may generate a composite image by composing a plurality of captured images after reshaping each of the plurality of captured image so that the plurality of captured images have the matched shape of the reference member 60 within the captured images, respectively. In such a case, image reshaping can be performed without using the shape of the reference member 60 viewed from the front as a reference.

Further, although the case where a captured image is a still image has been described in the above example embodiments, a captured image may be a moving image. In such a case, it is possible to similarly generate the optimal composite image by selecting a frame image that satisfies a predetermined capturing condition out of frame images included in a moving image.

Further, although the above example embodiments have been described in the assumption that the fingerprint 50 and the reference member 60 are captured together at once with the reference member 60 being placed so as to surround the fingerprint 50, the reference member 60 may be electrically provided on the screen. For example, a captured image including an electronic scale and the fingerprint 50 may be generated by using a function of a gyro sensor, a distance measuring application, or the like in the user terminal 20 to reshape the shape of the electronic scale corresponding to the reference member 60 in the screen in accordance with a capturing angle and a capturing distance.

Further, although the case where the user terminal 20 provides a common image ID to a plurality of captured images obtained by capturing the same subject and transmits the captured images has been described in the above example embodiments, the user terminal 20 may transmit the captured images provided with an ID unique to a terminal (for example, a MAC address). By associating a terminal ID with captured images, it is possible to use the terminal ID as a signature. Further, on the management server 10 side, with reference to a terminal ID provided to captured images, only the captured images taken by the same terminal can be used for an image composition process.

Further, although the case where captured images are composed on the user terminal 20 side has been described in the above second example embodiment, a flag indicating that the captured images are captured images used in composition may be provided to the captured images transmitted to the management server 10. Accordingly, the relationship between the captured images and the composite image can be easily recognized on the management server 10 side.

Further, the user terminal 20 may have a secure module and be configured in the module to provide an electronic signature to an image (captured images and a composite image) to be transmitted to the management server 10 or data to be transmitted simultaneously with the image. By providing an electronic signature, it is possible to prevent falsification of an image itself or falsification of image management information such as a capturing time, a capturing place, or the like.

Further, a configuration that manages a relationship between image data so as to be able to trace which captured image each image region in a composite image is based on may be further provided. For example, block chains can be used to trace an original captured image from a composite image. By enabling tracing of all the captured images used in generation of one composite image, it is possible to improve the evidence capability of an image when a composite image is used for examination of a fingerprint or the like, for example.

Further, the scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
an acquisition unit that acquires a plurality of captured images each including a reference member, which has a known shape, and a subject; and
a composition unit that generates one composite image from the plurality of captured images based on the shape of the reference member included in each of the plurality of captured images.

(Supplementary Note 2)

The information processing apparatus according to supplementary note 1, wherein the plurality of captured images are images captured from capturing positions different from each other.

(Supplementary Note 3)

The information processing apparatus according to supplementary note 1 or 2, wherein the subject is a dermatoglyphic pattern of a person.

(Supplementary Note 4)

The information processing apparatus according to any one of supplementary notes 1 to 3, wherein the composition unit generates the composite image by composing the plurality of captured images after reshaping each of the plurality of captured images so that the plurality of captured images have a matched shape of the reference member within the captured images, respectively.

(Supplementary Note 5)

The information processing apparatus according to any one of supplementary notes 1 to 4, wherein the composition unit generates the composite image by composing the plurality of captured images after reshaping each of the plurality of captured images so that the shape of the reference member within each of the captured images matches a shape of the reference member viewed from front.

(Supplementary Note 6)

The information processing apparatus according to any one of supplementary notes 1 to 5, wherein the composition unit generates the composite image by selecting and composing captured images that satisfy a predetermined capturing condition out of the plurality of captured images.

(Supplementary Note 7)

The information processing apparatus according to supplementary note 6, wherein the capturing condition includes at least one of a capturing position and a reflecting region of illumination light.

(Supplementary Note 8)

The information processing apparatus according to any one of supplementary notes 1 to 7, wherein when the plurality of captured images include different missing regions, respectively, the composition unit supplements the missing region in one of the captured images with a pixel value of a corresponding region in another one of the captured images.

(Supplementary Note 9)

A terminal apparatus comprising:
an image capturing device that captures the plurality of captured images; and
the information processing apparatus according to any one of supplementary notes 1 to 8.

(Supplementary Note 10)

The terminal apparatus according to supplementary note 9 further comprising a notification unit that outputs a guidance message related to a capturing condition during capturing of the captured images.

(Supplementary Note 11)

An information processing system comprising:
the terminal apparatus according to supplementary note 8 or 9; and
a management server that collects the composite image acquired by the terminal apparatus,
wherein the terminal apparatus further comprises
a transmission unit that transmits the composite image to the management server.

(Supplementary Note 12)

An information processing system comprising:
a terminal apparatus; and
a management server comprising the information processing apparatus according to any one of supplementary notes 1 to 8,
wherein the terminal apparatus comprises
an image capturing device that captures the plurality of captured images, and
a transmission unit that transmits the plurality of captured images to the management server.

(Supplementary Note 13)

An information processing method comprising:
acquiring a plurality of captured images each including a reference member, which has a known shape, and a subject; and
generating one composite image from the plurality of captured images based on the shape of the reference member included in the captured images.

(Supplementary Note 14)

A storage medium storing a program that causes a computer to perform:
acquiring a plurality of captured images each including a reference member, which has a known shape, and a subject; and
generating one composite image from the plurality of captured images based on the shape of the reference member included in the captured images.

This application is based upon and claims the benefit of priority from Japanese Patent Application No. 2018-242029, filed on Dec. 26, 2018, the disclosure of which is incorporated herein in its entirety by reference.

REFERENCE SIGNS LIST

1 image management system
10 management server
11 storage unit
12 image acquisition unit
13 image composition unit
20 user terminal
21 storage unit
22 image capturing unit
23 image transmission unit
24 notification unit
25 image composition unit
30 network
40 base station
50 fingerprint
60 reference member
100 information processing apparatus
110 acquisition unit
120 composition unit
151, 251 CPU 152, 252 RAM
153, 253 ROM
154 HDD
155, 255 communication I/F
156, 256 display device
157, 257 input device
158, 258 bus
254 flash memory
259 image capturing device

What is claimed is:

1. An information processing apparatus comprising:
at least one memory storing instructions; and
at least one processor configured to execute the instructions to:
acquire a plurality of captured images each including a reference member, which has a known first shape, and a subject; and
generate one composite image from the plurality of captured images based on a second shape of the reference member included in each of the plurality of captured images and the first shape,
wherein the at least one processor is configured to generate the composite image by composing the plurality of captured images after reshaping each of the plurality of captured images so that the plurality of captured images have a matched shape of the reference member within the captured images, respectively.

2. The information processing apparatus according to claim 1, wherein the plurality of captured images are images captured from capturing positions different from each other.

3. The information processing apparatus according to claim 1, wherein the subject is a dermatoglyphic pattern of a person.

4. The information processing apparatus according to claim 1, wherein the processor is configured to generate the composite image by composing the plurality of captured images after reshaping each of the plurality of captured images so that the second shape of the reference member within each of the captured images matches a shape of the reference member viewed from front.

5. The information processing apparatus according to claim 1, wherein the processor is configured to generate the composite image by selecting and composing captured images that satisfy a predetermined capturing condition out of the plurality of captured images.

6. The information processing apparatus according to claim 5, wherein the capturing condition includes at least one of a capturing position and a reflecting region of illumination light.

7. The information processing apparatus according to claim 1, wherein the processor is configured to supplement the missing region in one of the captured images with a pixel value of a corresponding region in another one of the captured images when the plurality of captured images include different missing regions, respectively.

8. A terminal apparatus comprising:
an image capturing device that captures the plurality of captured images; and
the information processing apparatus according to claim 1.

9. The terminal apparatus according to claim 8 is further configured to output a guidance message related to a capturing condition during capturing of the captured images.

10. An information processing system comprising:
the terminal apparatus according to claim 8; and
a management server that collects the composite image acquired by the terminal apparatus,
wherein the terminal apparatus is further configured to transmit the composite image to the management server.

11. An information processing system comprising:
a terminal apparatus; and
a management server comprising the information processing apparatus according to claim 1,
wherein the terminal apparatus comprises
an image capturing device that captures the plurality of captured images, and
the terminal apparatus transmits the plurality of captured images to the management server.

12. An information processing method comprising:
acquiring a plurality of captured images each including a reference member, which has a known first shape, and a subject; and
generating one composite image from the plurality of captured images based on a second shape of the reference member included in the captured images and the first shape,
wherein the composite image is generated by composing the plurality of captured images after reshaping each of the plurality of captured images so that the plurality of captured images have a matched shape of the reference member within the captured images, respectively.

13. A non-transitory storage medium storing a program that causes a computer to perform:
acquiring a plurality of captured images each including a reference member, which has a known first shape, and a subject; and
generating one composite image from the plurality of captured images based on a second shape of the reference member included in the captured images and the first shape,
wherein the composite image is generated by composing the plurality of captured images after reshaping each of the plurality of captured images so that the plurality of captured images have a matched shape of the reference member within the captured images, respectively.

* * * * *